UNITED STATES PATENT OFFICE.

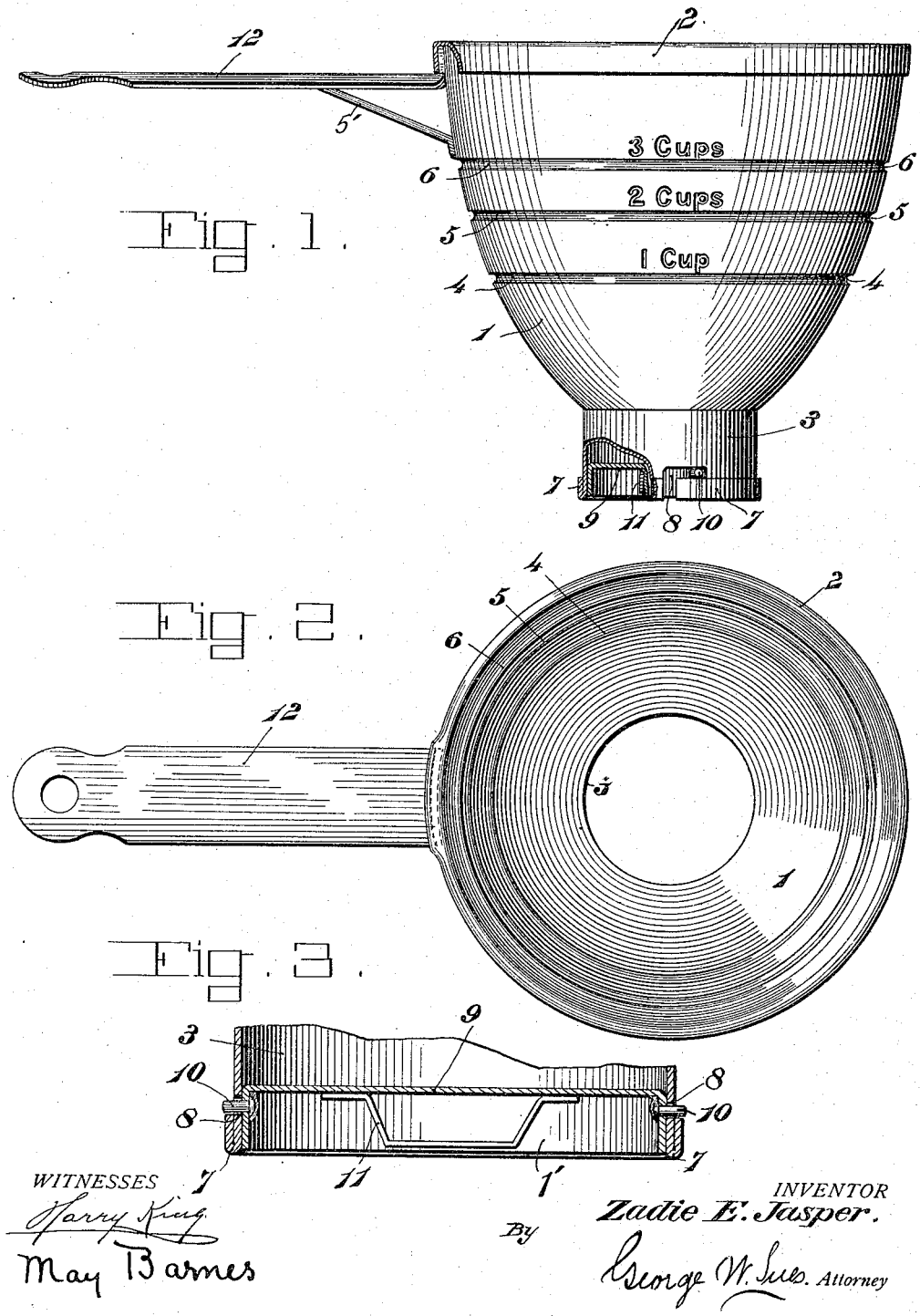

ZADIE E. JASPER, OF NAPANOCH, NEW YORK.

FUNNEL.

1,196,784.              Specification of Letters Patent.          Patented Sept. 5, 1916.

Application filed February 18, 1913. Serial No. 749,194.

*To all whom it may concern:*

Be it known that I, ZADIE E. JASPER, a citizen of the United States, and a resident of Napanoch, in the county of Ulster and State of New York, have invented certain new and useful Improvements in Funnels, of which the following is a specification, reference being had to the accompanying drawings.

This invention relates to certain new and useful improvements in funnels and the object of my invention is to provide a kitchen funnel especially adapted to be used in the filling of glass fruit jars and preserving cans.

Another object is to provide a funnel so arranged that the same can be used for measuring purposes or as a scoop, a removable cap arranged to close the funnel spout being employed when the funnel is used as a measure or scoop.

A further object is to provide a kitchen funnel having a cylindrical spout constructed so that the same will stand upright upon the spout edge.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views: Figure 1, shows a side elevation of a funnel embodying my invention with parts broken away, the cap being shown in position. Fig. 2, is a top view of the funnel, the cap being shown removed. Fig. 3, is an enlarged, broken, sectional detail of the lower portion of the spout showing the cap in position.

In my present invention I provide a funnel especially adapted to be used in the preserving of fruits and vegetables. First, with the cap in position, the funnel may be used as a scoop or a measure in measuring out the several ingredients used in preserving the fruit or vegetables, the bowl of the funnel being provided with indicia of quantities. With the cap in position the funnel may also be used as a ladle for dipping purposes. With the cap removed the funnel will accurately fit into an ordinary, conventionally constructed glass fruit jar or preserving can, the stub spout doing service in holding the funnel in position enabling the cook to fill the jars or cans with ease, accuracy and despatch, and in a manner avoiding any slopping over or spilling of the preserves.

In the drawings the numeral 1, designates the bowl of the funnel which is made of any suitable material and 2, the upper edge which is recurved. Intermediate of its ends the bowl has a plurality of inwardly directed circumscribing beads, marked 4, 5 and 6, which form indicia of quantities, the first being marked 1 cup, the second, two cups and the third, 3 cups. While cup measurements are shown in the drawings, it is of course understood that the indicia could be in ounces.

The spout or neck of the funnel is cylindrical and forms in effect a stub collar 3, arranged to fit into the neck of a Mason or other glass fruit jar or preserving can.

As shown, the lower edge 7 of the collar is bent back outwardly to provide a double thickness at the lower end of the spout. At opposite points this collar is provided with the edge entering bayonet slots 8, and as shown in Fig. 1, the lower edge of the transverse portion of the slots end in alinement with the turned back edge 7.

In order to close the spout 3, I employ a cap in the form of a disk 9 having the outstanding circumscribing flange 1′, and extending from opposite points from this flange are the pins 10. These pins are arranged for coaction with the bayont slots 8. As the material of which these funnels are made is rather thin the turned back edge 7, also aids in supporting the pins 10, as shown in Fig. 3. Secured to the under face of the cap 9, is the handle 11, which is of such a size that it will not project below the lower edge of the funnel collar 3, so that this funnel can at all times be made to stand upright upon its lower spout edge.

Secured to the upper portion of the funnel, as shown in Fig. 1, is a handle 12 which is braced by means of the member 5′.

A funnel constructed according to my invention is simple and inexpensive in construction, and both durable and efficient in operation and, as explained, may be made to do service as a funnel, a ladle or scoop and as a measure.

Having thus described my said invention, what I claim as new and desire to secure by United States Letters Patent is:

A kitchen funnel especially constructed to be used in connection with a conventionally constructed glass fruit jar, comprising a sheet metal bowl-shaped funnel member ending in a cylindrical collar arranged to fit into the neck of a glass fruit jar, the lower edge of said collar being bent back and of a double thickness, two edge-entering bayonet slots being provided at opposite points within the collar, the lower edges of the transverse portions of said slots being in alinement with the bent-back edge, a cap in the form of a disk having an outstanding circumscribing flange arranged to snugly fit into said collar, pins extending from opposite points of this flange arranged for co-action with said bayonet slots, and a handle secured to the under face of said cap said handle being contained below said flange, whereby said funnel may be firmly supported upon said collar.

In testimony whereof I affix my signature, in the presence of two witnesses.

ZADIE E. JASPER.

Witnesses:
OSCAR M. SMITH,
ALICE E. HORTON.

Copies of this patent may be obtained for five cents each, by addressing the "Commissioner of Patents, Washington, D. C."